United States Patent
Matsumura

(10) Patent No.: US 7,375,471 B2
(45) Date of Patent: May 20, 2008

(54) CHARGING CIRCUIT

(75) Inventor: Yasuo Matsumura, Kyoto (JP)

(73) Assignee: Texas Instruments Incorporated, Dallas, TX (US)

( * ) Notice: Subject to any disclaimer, the term of this patent is extended or adjusted under 35 U.S.C. 154(b) by 17 days.

(21) Appl. No.: 11/469,641

(22) Filed: Sep. 1, 2006

(65) Prior Publication Data

US 2007/0114950 A1    May 24, 2007

(30) Foreign Application Priority Data

Sep. 2, 2005    (JP)    ............................. 2005-254419

(51) Int. Cl.
*H05B 37/00*    (2006.01)
(52) U.S. Cl. .............. 315/241 P; 315/219; 315/200 A; 315/241 R; 315/232; 315/276; 323/271; 323/277; 363/21.13; 363/21.05
(58) Field of Classification Search ............ 315/200 A, 315/219, 232, 239, 240, 241 P, 241 R, 276, 315/279, 283; 323/271, 277, 281–285; 363/15, 363/21.05, 21.12, 21.13; 396/205, 206
See application file for complete search history.

(56) References Cited

U.S. PATENT DOCUMENTS

| 4,479,076 A | * | 10/1984 | Yamaoka et al. | ........ 315/241 P |
| 5,068,575 A | * | 11/1991 | Dunsmore et al. | ....... 315/241 P |
| 5,912,552 A | * | 6/1999 | Tateishi | ....................... 323/285 |

* cited by examiner

*Primary Examiner*—Haissa Philogene
(74) *Attorney, Agent, or Firm*—William B. Kempler; W. James Brady, III; Frederick J. Telecky, Jr.

(57) ABSTRACT

A charging circuit has a battery 12, switching element 14, and resistor 16 for current detection arranged on the primary side of transformer 10. Diode 18 and capacitor 20 for storing electric power are arranged on the secondary side of transformer 10. In a normal state, the ON/OFF states of switching element 14 are repeated corresponding to output signals $U_1$, $U_2$ of two comparators 28, 30. However, if switching element 14 stays on or off longer than a prescribed period of time for some reason, the status of switching 14 will be switched forcibly by an auxiliary sequence of the logic parts in control logic 42.

22 Claims, 8 Drawing Sheets

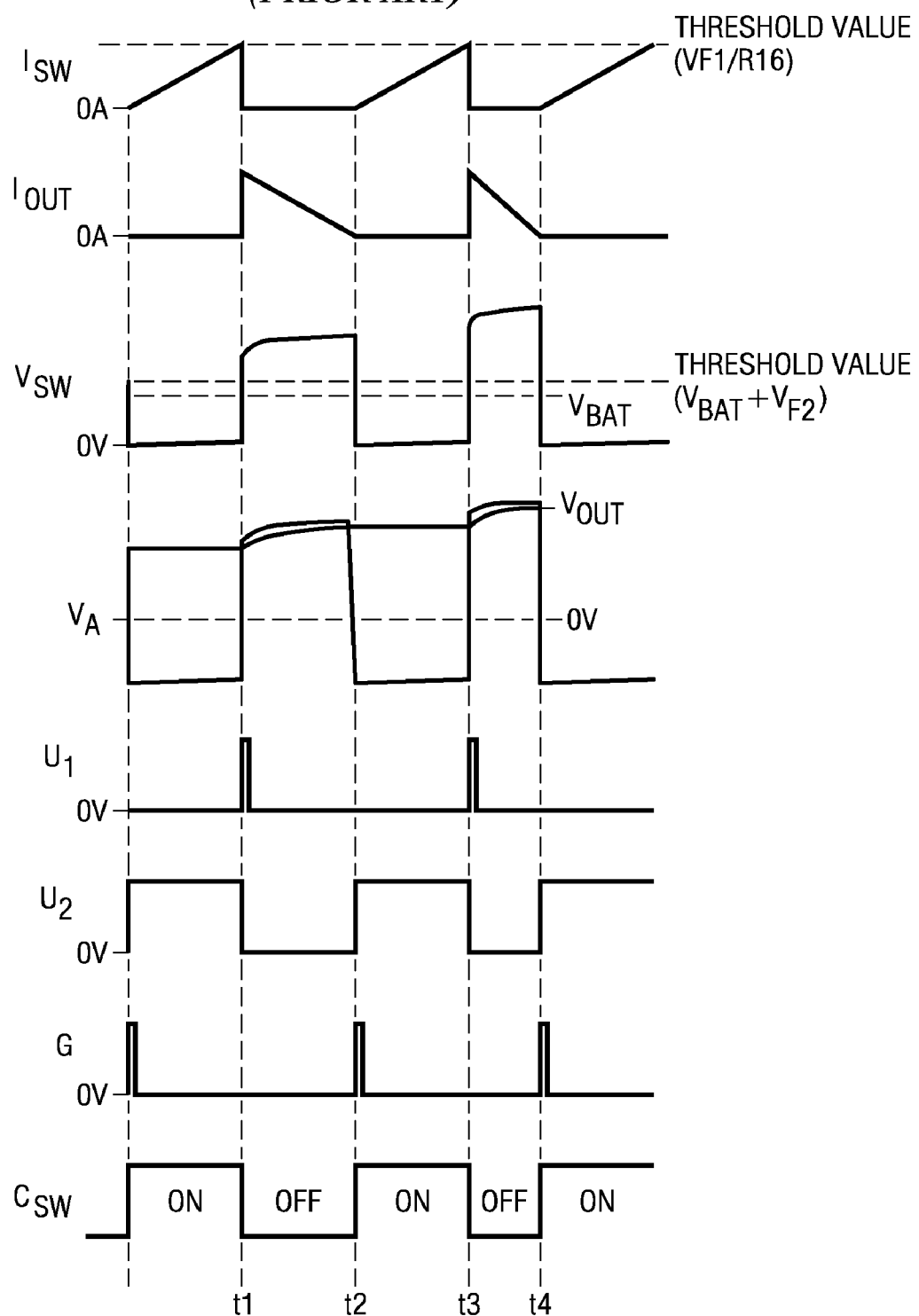

CHARGING CIRCUIT

FIELD OF THE INVENTION

The present invention pertains to a circuit that performs DC-DC conversion to the output voltage of a DC power supply to charge a capacitor for storing electric power. In particular, the present invention pertains to an insulation type charging circuit using a transformer.

BACKGROUND OF THE INVENTION

A typical example of such a charging circuit is a photoflash charging circuit that charges a capacitor used for turning on a photoflash lamp. FIG. 7 shows the circuit configuration of a conventional photoflash charging circuit.

In this photoflash charging circuit, battery 12, switching element 14, and resistor 16 for current detection are connected in series on the primary side of transformer 10. Diode 18 for rectification and capacitor 20 for storing electric power are connected in series on the secondary side of transformer 10. Photoflash lamp 22 connected to capacitor 20 on the secondary side is constituted by, for example, a xenon flash lamp. It is normally kept in an insulated state and instantaneously discharges (becomes conductive) when a high voltage is applied from a trigger circuit (not shown in the figure) to trigger electrode 23 when taking a picture. When lamp 22 discharges, the electric power stored in capacitor 20 flows into lamp 22, and the xenon gas in the lamp becomes luminescent.

Battery 12 is connected between one terminal 24a of primary coil 24 and ground potential as the reference potential on the primary side of transformer 10. Switching element 14 and resistor 16 are connected in series between the other terminal 24b of primary coil 24 and the ground potential. When switching element 14 is on, current (primary current) $I_{sw}$ flows in the closed loop on the primary side, and electromagnetic energy is stored in primary coil 24. When switching element 14 is turned off, the primary current $I_{sw}$ that has been flowing is cut off. At the same time, the electromagnetic energy stored in primary coil 24 is transferred to secondary coil 26 through electromagnetic induction. Current (secondary current) $I_{out}$ flows in the forward direction through diode 18 in the secondary circuit. Capacitor 20 is charged by said secondary current $I_{out}$. When switching element 14 is turned on/off repeatedly, the charging voltage $V_{out}$ of capacitor 20 can be increased stepwise.

On the primary side of the photoflash circuit, comparator 28 is used to obtain the timing of switching element 14 from the ON state to the OFF state, and a comparator 30 is used to obtain the timing of switching element 14 from the OFF state to ON state.

The two terminals of resistor 16 are connected to the two input terminals (+), (−) of comparator 28. More specifically, the positive terminal of resistor 16 is directly connected to the positive input terminal (+) of comparator 28, and the negative terminal of resistor 16 is connected to the negative input terminal (−) of comparator 28 via the ground and reference voltage source 32. If the resistance of resistor 16 is $R_{16}$, the voltage drop $V_{16}$ is $V_{16}=I_{sw} \cdot R_{16}$. If the voltage of reference voltage source 32 is taken as $V_{F1}$ (constant value), the output signal $U_1$ of comparator 28 is at level L when $V_{16}<V_{F1}$. The output signal of comparator 28 changes from level L to level H when $V_{16} \geq V_{F1}$. The output terminal of comparator 28 is connected to the reset input terminal (R) of RS latch circuit 34 constituted by an RS flip-flop. The output terminal (Q) of RS latch circuit 34 is connected to the control terminal of switching element 14. When the output signal $U_1$ of comparator 28 switches from level L to level H, RS latch circuit 34 is reset at the rising edge of the output signal. The output signal of RS latch circuit 34, that is, the switching control signal $C_{sw}$, switches from level H to level L. As a result, switching element 14 is switched from the ON state to the OFF state.

The two terminals 24a, 24b of primary coil 24 are connected to the two input terminals (+), (−) of comparator 30. More specifically, one terminal 24a (on the side of battery 12) of primary coil 24 is directly connected to the positive input terminal (+) of comparator 30. The other terminal 24b (on the side of switching element 14) of primary coil 24 is connected to the negative input terminal (−) of comparator 30 via reference voltage source 36. During the period when primary current $I_{sw}$ flows in the primary circuit, since the voltage on the side of terminal 24a of primary coil 24 (output voltage $V_{BAT}$ of battery 12) is not lower than the voltage on the side of terminal 24b of primary coil 24 (terminal voltage $V_{SW}$ of switching element 14), the output signal $U_2$ of comparator 30 becomes level H. When switching element 14 is switched from the ON state to the OFF state and primary current $I_{sw}$ stops instantaneously, an induced electromotive force, with terminal 24b as the positive side and terminal 24a as the negative side, is generated between the two terminals of primary coil 24 as a result of electromagnetic induction. An induced electromotive force or secondary voltage $V_A$, obtained by multiplying the winding ratio by the induced electromotive force on the primary side, is also generated in secondary coil 26. In this case, the mutual inductance of transformer 10 is negative, and primary coil 24 and secondary coil 26 have opposite polarities. In other words, terminal 26a of secondary coil 26 with the same polarity as terminal 24a of primary coil 24 is connected to ground. Terminal 26b of secondary coil 26 with the same polarity as terminal 24b of primary coil 24 is connected to the anode terminal of diode 18. Consequently, the induced electromotive force or secondary voltage $V_A$ generated between the two terminals of secondary coil 26 has terminal 26b as the positive side and terminal 26a as the negative side, and thus becomes a bias in the forward direction of diode 18. Secondary current $I_{out}$ flows in the secondary circuit to charge capacitor 22.

On the other hand, when an induced electromotive force, with terminal 24b as the positive side and terminal 24a as the negative side, is generated between the two terminals of primary coil 24 as described above, the output signal $U_2$ of comparator 30 changes from level H to level L. The output terminal of comparator 30 is connected to the input terminal of one-shot circuit 38. The output terminal of one-shot circuit 38 is connected to the set input terminal (S) of RS latch circuit 34. One-shot circuit 38 does not operate in response to the dropping of comparator output signal $U_2$ from level H to level L. When secondary current $I_{out}$ flows in the secondary circuit as described above, the electromagnetic energy of transformer 10 is converted to secondary current $I_{out}$ and is gradually reduced. The secondary voltage $V_A$ gradually drops. The voltage between the two terminals of primary coil 24 also gradually drops in proportion to secondary voltage $V_A$.

When the value obtained after subtracting voltage $V_{F2}$ (constant value) of reference voltage source 36 from the voltage between the two terminals of primary coil 24 is negative, that is, when the switch terminal voltage $V_{SW}$ is lower than $(V_{BAT}+V_{F2})$ obtained by adding the voltage $V_{F2}$ of reference voltage source 36 to the output voltage $V_{BAT}$ of battery 12, the output signal $U_2$ of comparator 30 changes from level L to level H. Correspondingly, a positive pulse G with a certain pulse width is output from one-shot circuit 38, and a set signal is input into the set input terminal (S) of RS latch circuit 34. As a result, the output signal of RS latch circuit 34, that is, switching control signal $C_{SW}$, switches from level L to level H. As a result, switching element 14 is switched from the OFF state to the ON state. Subsequently, the ON/OFF state of switching element 14 is repeated as the operation and control are repeated. The charging voltage ($V_{out}$) of capacitor 20 is increased gradually or stepwise to the set level.

FIG. 8 shows the operation of said photoflash charging circuit (FIG. 7) depending on the signal waveform of each part. In this figure, switching element 14 is switched from the ON state to the OFF state at times $t_1$, $t_3$. Switching element 14 is switched from the OFF state to the ON state at times $t_2$, $t_4$. As shown in the figure, as the charging voltage $V_{out}$ of capacitor 20 rises, the secondary voltage $V_A$ induced on the secondary side rises immediately after switching off, and the negative slope of secondary current $I_{out}$ is increased (in other words, the flowing period of secondary current $I_{out}$ becomes shorter). When the charging voltage $V_{out}$ of the capacitor reaches the set level, secondary voltage $V_A$ reaches a prescribed level. Charging end detecting circuit 40 shown in FIG. 7 detects the end of charging of capacitor 20 when the induced electromotive force on the primary side correlated with secondary voltage $V_A$ reaches the set value and turns off switching element 14 to stop the charging operation. Then, switching element 14 is kept in the OFF state until the next charging operation is started.

FIG. 9 shows the state transition and its conditions for said photoflash charging circuit (FIG. 7). Mode A, in which switching element 14 is turned on and the power supplied from battery 12 is stored in transformer 10 in the form of electromagnetic energy, and mode B, in which switching element 14 is turned off and the electromagnetic energy of transformer 10 is converted into secondary current $I_{out}$ and then to the charging (electrostatic) energy of capacitor 20, are repeated alternately. Transition from mode A to mode B occurs when comparator 28 detects the fact that primary current $I_{sw}$ has increased to a prescribed value or larger. Transition from mode B to mode A occurs when comparator 30 detects the fact that the voltage between the two terminals of primary coil 24 has dropped to reference value $V_{F2}$ or lower.

For the conventional charging circuit, however, in the following special cases, switching element 14 stays in the ON or OFF state. As a result, the charging operation virtually stops.

When the power supply capacity of battery 12 is reduced to near the empty state, as shown in FIG. 10, primary current $I_{sw}$ increases slowly since switching element 14 is turned on, and a fairly long time is required to reach the threshold value ($V_{F1}/R_{16}$). Switching element 14 stays in the ON state. During that period, the electromagnetic energy of transformer 10 is not converted into secondary current $I_{out}$, and the charging operation virtually stops.

When the charging voltage of capacitor 20 becomes abnormally low or becomes negative due to a short circuit or other reasons on the secondary side, as shown in FIG. 11, the induced electromotive force on the secondary side or secondary voltage $V_A$ generated by electromagnetic induction immediately after switching element 14 is turned off becomes small. This is reflected on the primary side. The induced electromotive force on the primary side also becomes small. In this case, when the switch terminal voltage $V_{SW}$ on the primary side does not exceed threshold value ($V_{BAT}+V_{F2}$), the output logic of comparator 30 is held without change. The signal to turn on switching element 14 again cannot be generated, and movement to the next charging cycle is not possible. The charging operation virtually stops.

When malfunction occurs in comparators 28, 30 or control logic 35 (RS latch circuit 34, one-shot circuit 38) due to electrostatic electricity, electromagnetic waves, or other external reasons, freezing may occur with switching element 14 in either the ON state or OFF state. The charging operation also stops in this case.

A general object of the present invention is to solve the problems of the conventional technology by providing a charging circuit that can continue the switching operation for charging in a stable and reliable manner, even under special conditions, so that the charging operation can be carried out reliably.

SUMMARY OF THE INVENTION

This and other objects and features are provided in accordance with one aspect of the present invention by a charging circuit that converts the output voltage of a DC power supply on the primary side of a transformer into an AC voltage by a switching operation, and rectifies the AC voltage on the secondary side of the transformer to charge a capacitor for storing electric power. This charging circuit has the following: a switching element arranged in the primary circuit of the transformer; a first switching circuit that monitors the primary current flowing in the primary circuit and turns on the switching element from the OFF state when the value of the primary current has increased to a first reference value or larger; a second switching circuit that monitors the voltage between the terminals of the primary coil or secondary coil of the transformer and turns on the switching element from the OFF state when the voltage between the terminals of the coil drops to a second reference value or lower; a third switching circuit that counts a first period from the time when the switching element was turned on and forcibly turns off the switching element from the ON state if the switching element has not turned off after the first period has elapsed; and a fourth switching circuit that counts a second period from the time when the switching element was turned off and forcibly turns on the switching element from the OFF state if the switching element has not turned on after the second period has elapsed.

In the configuration, when the switching element is turned on, a primary current flows in the primary circuit of the transformer. No secondary current flows in the secondary circuit. Electromagnetic energy is stored in the transformer by the primary current. When the primary current is increased to a first reference value or larger within a certain period of time, that is, the first period of time, the switching element is switched from the ON state to the OFF state by the first switching circuit at that time. However, if the primary current has not reached the first reference value after the first period of time has elapsed, the switching element is forcibly switched from the ON state to the OFF state by the third switching circuit instead of the first switching circuit.

Also, when the switching element is turned off, the primary current stops. A positive secondary voltage is generated in the secondary circuit of the transformer as a result of electromagnetic induction, and a secondary current flows to charge the capacitor. If a sufficiently high secondary voltage is induced and the voltage between the terminals of the primary or secondary coil of the transformer drops to the second reference value or lower within a certain period of time, that is, the second period of time, the switching element is switched from the OFF state to the ON state by the second switching circuit at that time. However, if the induced secondary voltage is low and the voltage between the terminals of the primary or secondary coil of the transformer does not drop to the second reference value after the second period of time has elapsed, the switching element is forcibly switched from the ON state to the OFF state by the fourth switching circuit instead of the second switching circuit.

In this aspect the timings of the state transition performed by the first and second switching circuits are not fixed and depend on the status of each part in the primary or secondary circuit. On the other hand, the timings of state transition performed by the third and fourth switching circuits are definitely fixed as long as one condition (the switching element is on or off) lasts. In this way, the switching element will not stay in the ON or OFF state for a long time or semipermanently so that an undesired stop in the charging operation can be avoided.

According to an embodiment of the present invention, in order to monitor the value of the primary current, the first switching circuit has a resistor arranged in the primary circuit and a first comparator with one of the input terminals connected to one of the terminals of the resistor and the other input terminal connected to the other terminal of the resistor. The first switching circuit can have a first reference voltage source connected between one of the input terminals of the first comparator and the corresponding terminal of the resistor to generate a first reference voltage corresponding to the first reference value. Also, the first switching circuit has a first latch circuit connected between the output terminal of the first comparator and the control terminal of the switching element to turn off the switching element in response to the output signal generated by the first comparator when the value of the primary current is increases to the first reference value or larger.

According to a second aspect of the present invention in order to monitor the voltage between the two terminals of the coil, the second switching circuit has a second comparator with one of the input terminals connected to one of the terminals of the coil and the other input terminal connected to the other terminal of the coil. The second switching circuit can have a second reference voltage source connected between one of the input terminals of the second comparator and the corresponding terminal of the coil to generate a second reference voltage corresponding to the second reference value. Also, the second switching circuit can have a second latch circuit connected between the output terminal of the second comparator and the control terminal of the switching element to turn on the switching element in response to the output signal generated by the second comparator when the voltage between the two terminals of the coil drops to the second reference value or lower.

In an embodiment, the first latch circuit in the first switching circuit and the second latch circuit in the second switching circuit share one RS flip-flop.

According to an embodiment, to count the first period of time, the third switching circuit has a first clock circuit that generates a first clock pulse and a first counter that counts the first clock pulse up to a first preset value corresponding to the first period of time. Also, in an embodiment, the third switching circuit has a first counting trigger circuit that starts the counting operation of the first counter corresponding to a first switching control signal used for switching the switching element from off to on. In addition, the third switching circuit can have a first time counting interrupting circuit that interrupts the counting operation of the first counter when the switching element is switched from the ON state to the OFF state by the first switching circuit during counting of the first period of time.

According to an embodiment, to count the second period of time, the fourth switching circuit has a second clock circuit that generates a second clock pulse and a second counter that counts the second clock pulse up to a second preset value corresponding to the second period of time. Also, in an embodiment, the fourth switching circuit has a second counting trigger circuit that starts the counting operation of the second counter corresponding to a second switching control signal used for switching the switching element from the ON state to the OFF state. In addition, the fourth switching circuit preferably has a second time counting interrupting circuit that interrupts the counting operation of the second counter when the switching element is switched from the ON state to the OFF state by the second switching circuit during counting of the second period of time.

Also, according to an embodiment, the third and fourth switching circuits share one counter.

Also, in an embodiment, the charging circuit also has a control circuit that can forcibly turn off the switching element when the charging voltage of the capacitor reaches a set level and can keep the switching element in the OFF state until the next charging operation is started.

When the present invention is applied to a photoflash charging circuit, a photoflash lamp is connected to the capacitor, and the capacitor is discharged to the lamp in order to turn on the lamp.

According to the third aspect of the present invention a charging circuit that controls the ON/OFF operation of a switching element to supply a charging current to a coil, has a driving circuit that supplies a driving signal used for controlling the ON/OFF operation of the switching element; a first detecting circuit used for detecting the current flowing through the switching element; a second detecting circuit used for detecting the voltage applied to the coil or the voltage applied to a charging objective element; a timer circuit used for counting a prescribed period of time corresponding to the logic change of the driving signal; a first control circuit that supplies a first control signal used for turning off the switching element in response to a first detection signal output from the first detecting circuit and a first timeout signal output from the timer circuit; and a second control circuit that supplies a second control signal used for turning on the switching element in response to a second detection signal output from the second detecting circuit and a second timeout signal output from the timer circuit; the driving circuit supplies the driving signal corresponding to the first and second signals.

For this charging circuit, according to an embodiment, the timer circuit has a first timer to output the first timeout signal and a second timer to output the second timeout signal. Also, the charging circuit preferably has a timer reset circuit that resets the time counting operation of the timer circuit corresponding to at least one logic change in the first detection signal, second detection signal, and driving signal.

Also, in an embodiment, the coil is the primary coil of a transformer, and a capacitor for charging is connected to the secondary coil side of the transformer. In this case, the flash circuit is driven by the electric power stored in the capacitor for charging.

BRIEF DESCRIPTION OF THE DRAWINGS

FIG. 8 is a signal waveform diagram explaining the overall operation of the photoflash charging circuit shown in FIG. 7.

REFERENCE NUMERALS AND SYMBOLS AS SHOWN IN THE DRAWINGS

In the figures, 10 represents a transformer, 12 represents a battery, 14 represents a switching element, 16 represents a resistor for current detection, 18 represents a diode, 20 represents a capacitor, 22 represents a photoflash lamp, 24 represents a primary coil, 26 represents a secondary coil, 28 represents a comparator, 30 represents a comparator, 32, 36 represent reference voltage sources, 34 represents an RS latch circuit (RS flip-flop), 38 represents a one-shot circuit, 40 represents a charging end detecting circuit, 42 represents a control logic, 44 represents a one-shot circuit, 46, 46A, 46B represent timers, 48 represents a one-shot circuit, 50, 58 represents OR gates, 52, 54 represents AND gates, 62 represents a time counting interrupting circuit, 64 represents a forcible switching counter.

DESCRIPTION OF EMBODIMENTS

By using the charging circuit of the present invention, it is possible to continue the switching operation for charging in a stable and reliable manner, even under special conditions, so that the charging operation can be carried out reliably.

In the following, preferred embodiments of the present invention will be explained based on FIGS. 1-6.

Figure 1:
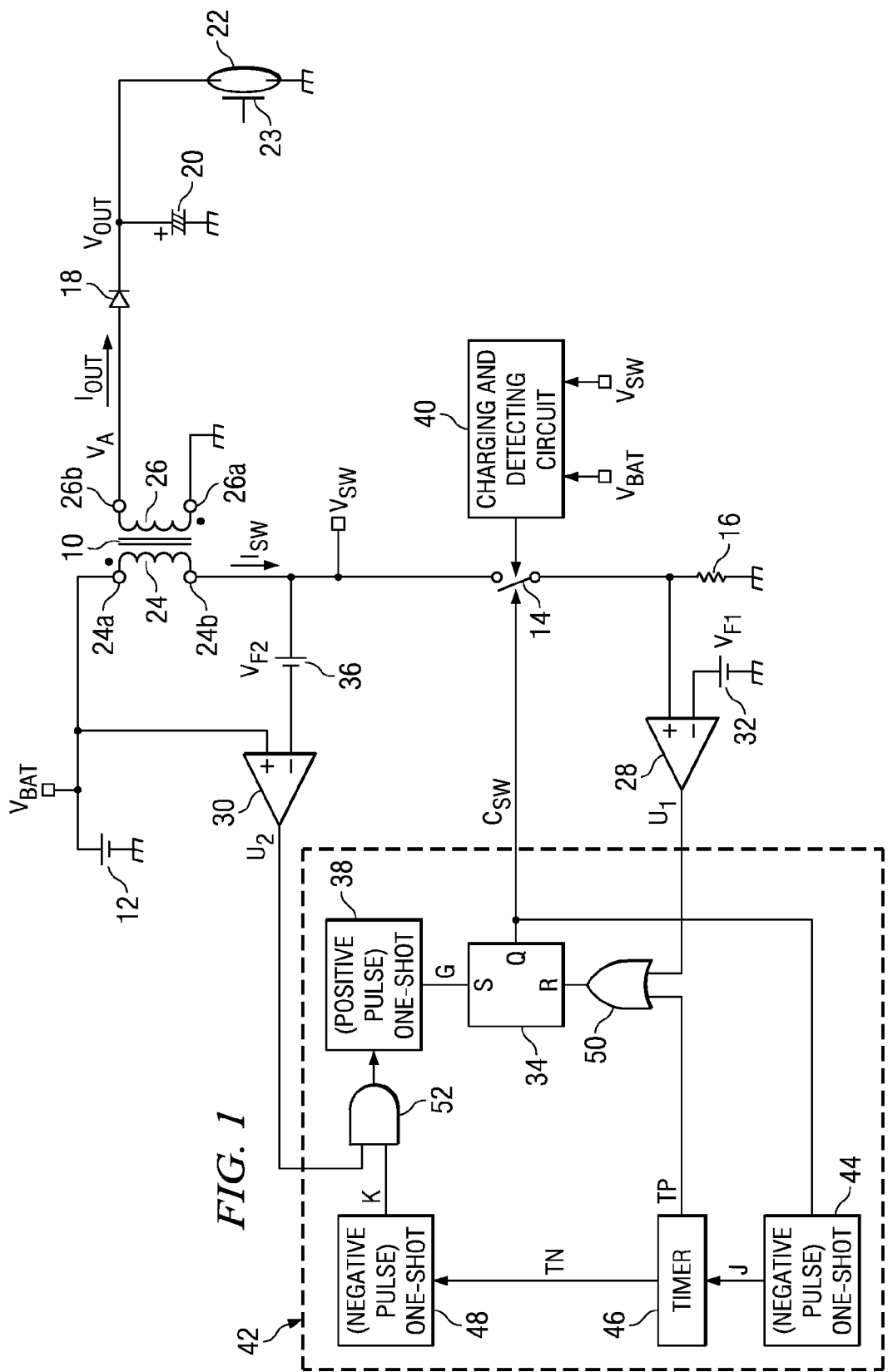
FIG. 1 is a circuit diagram illustrating the circuit configuration of the photoflash charging circuit disclosed in an embodiment of the present invention.
Figures 7, 9:
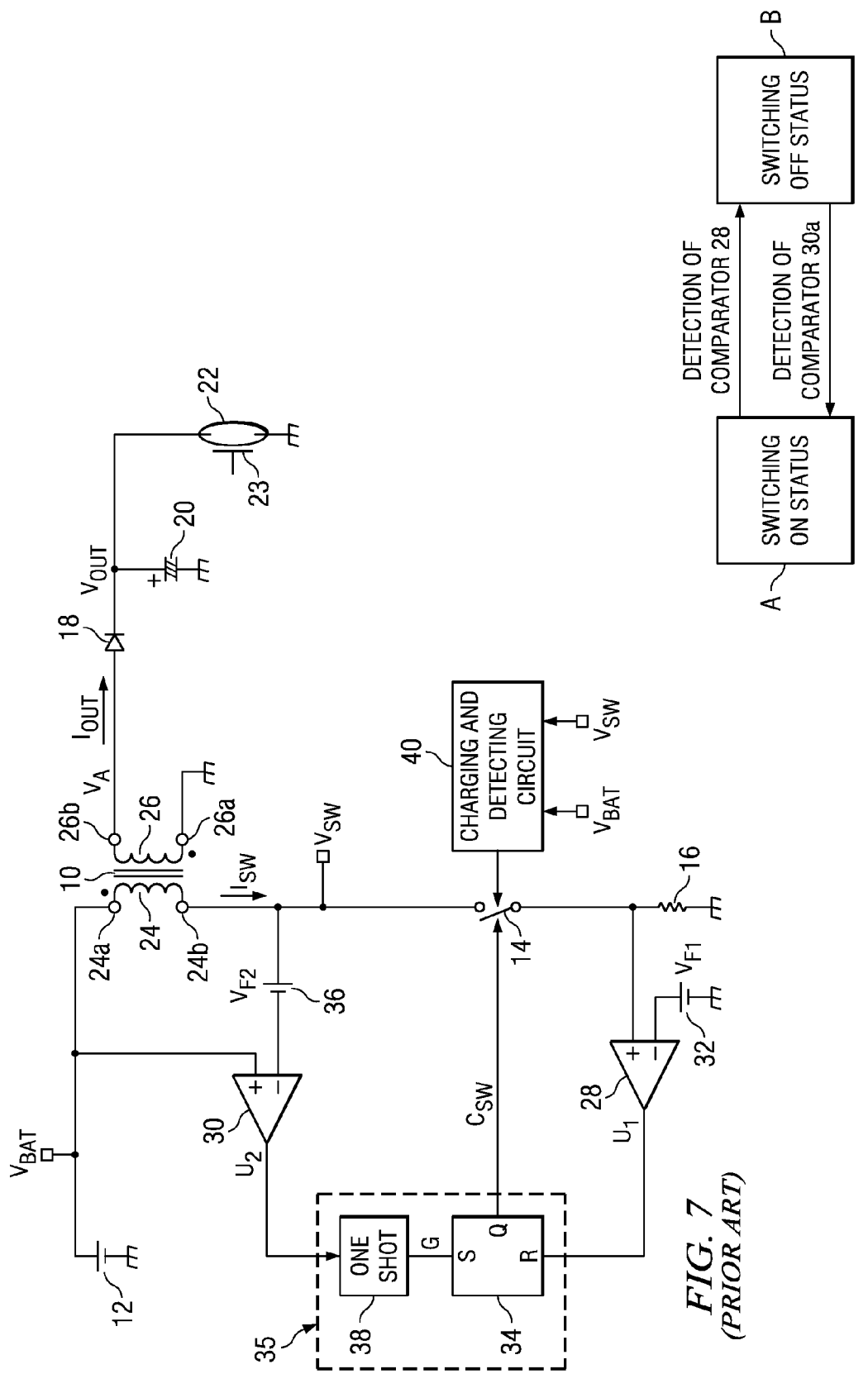
FIG. 7 is a circuit diagram illustrating the circuit configuration of a conventional photoflash charging circuit.
FIG. 9 is a diagram illustrating the status transition and its conditions in the photoflash charging circuit shown in FIG. 7.
Figure 10:
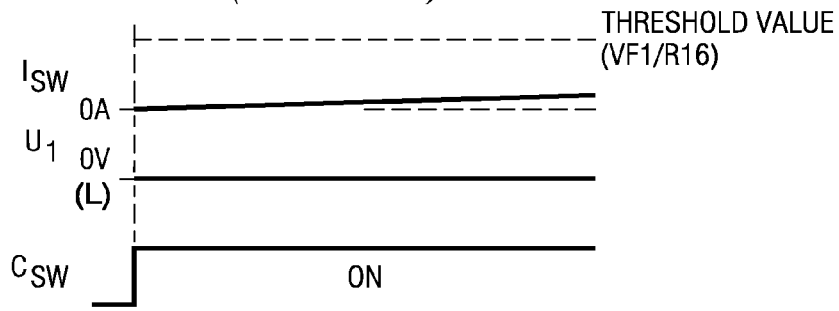
FIG. 10 is a signal waveform diagram explaining an example of the problem in the photoflash charging circuit disclosed in the embodiment.
Figure 11:
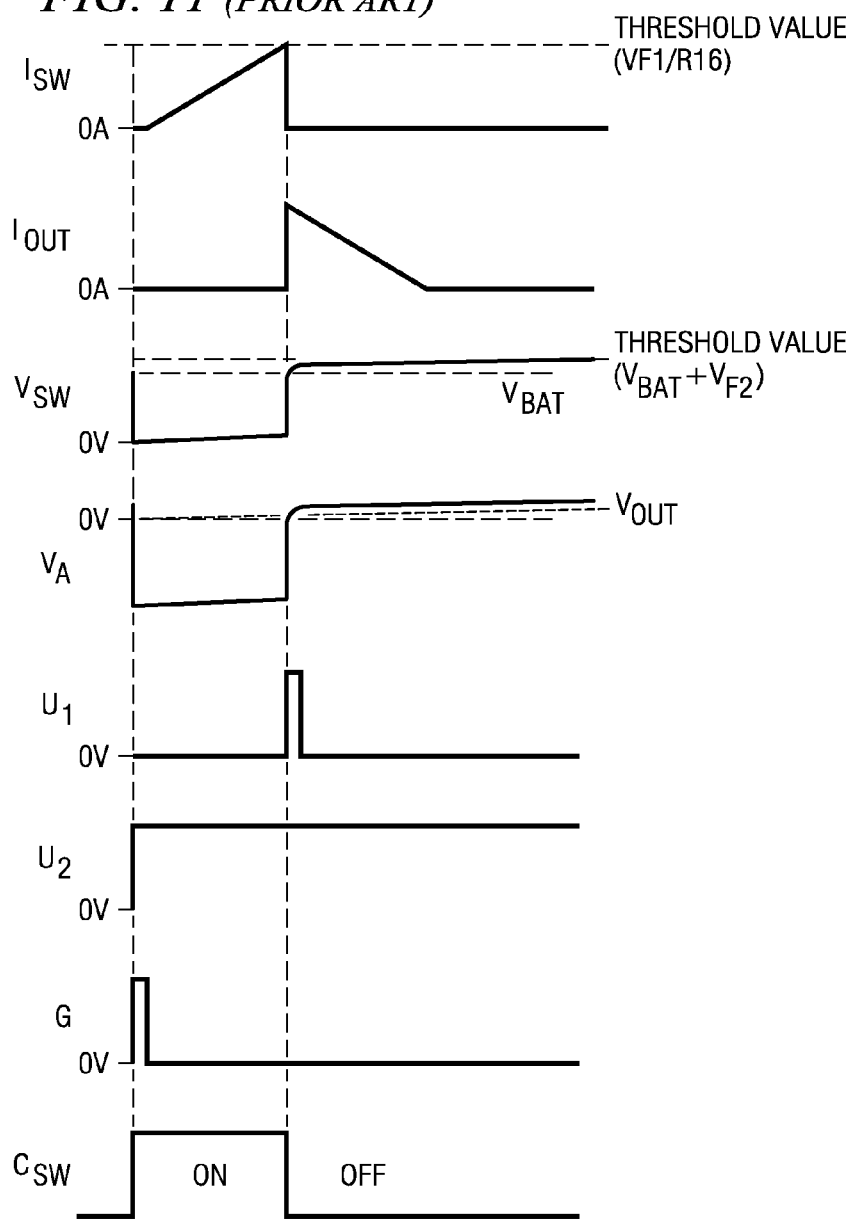
FIG. 11 is a signal waveform diagram explaining an example of the problem in the photoflash charging circuit disclosed in the embodiment.

FIG. 1 shows the circuit configuration of a photoflash charging circuit disclosed in an embodiment of the present invention. The characteristic parts of this photoflash charging circuit are in control logic 42. The parts outside control logic 42 are virtually the same as those of the conventional photoflash charging circuit (FIG. 7). Therefore, they are respectively represented by the same symbols. The configurations and effects of these parts will not be explained in detail.

Control logic part 42 has one-shot circuit 44, timer (timing circuit) 46, one-shot circuit 48, OR gate 50, and AND gate 52, in addition to RS latch circuit 34 and one-shot circuit 38.

In this case, the output terminal (Q) of RS latch circuit 34 is connected to the input terminal of one-shot circuit 44. The output terminal of one-shot circuit 44 is connected to the input terminal of timer 46. The output terminal of timer 46 is connected to the input terminal of one-shot circuit 48 and to one of the input terminals of OR gate 50. The output terminal of one-shot circuit 48 is connected to one of the input terminals of AND gate 52. The output terminal of comparator 30 is connected to the other input terminal of AND gate 52. The output terminal of AND gate 52 is connected to the input terminal of one-shot circuit 38. The output terminal of comparator 28 is connected to the other input terminal of OR gate 50. The output terminal of OR gate 50 is connected to the reset input terminal (R) of RS latch circuit 34. RS latch circuit 34 and one-shot circuit 38 are the same as those of the photoflash charging circuit shown in FIG. 7. The output terminal of one-shot circuit 38 is connected to the set input terminal (S) of RS latch circuit 34. The output terminal of RS latch circuit 34 (Q) is connected to the control terminal of switching control element 14. Switching control element 14 is usually constituted by a transistor, such as a MOS transistor. In the case of a MOS transistor, its gate terminal is equivalent to the control terminal.

In this photoflash charging circuit, when switching element 14 is turned on/off repeatedly as usual corresponding to output signals $U_1$, $U_2$ of two comparators 28, 30, the special logic parts 44-52 in this embodiment are irrelevant to the switching control. In other words, the output signals $U_1$, $U_2$ of comparators 28, 30 pass as they are through OR gate 50 and AND gate 52, and are supplied to the reset terminal (R) and set terminal (S) of RS latch circuit 34, respectively. However, if switching element 14 freezes in either the ON state or OFF state during a charging operation for some reason, logic parts 44-52 become relevant to the switching control to release the frozen state as described below.

One-shot circuit 44 operates in response to each rising edge and falling edge of the output signal of RS latch circuit 34, that is, switching control signal $C_{SW}$ to generate a negative pulse with a very small pulse width as count trigger signal J. Said signal J is supplied to timer 46.

Timer 46 has a clock circuit that generates clock pulses at a certain frequency, a counter that counts the clock pulses from the clock circuit, and a preset circuit that sets a preset value corresponding to a desired counting time (maximum ON/OFF time) for the counter. When counter trigger signal J is input from one-shot circuit 44, timer 46 starts the counting operation at the rising edge of the trigger signal. When the counted value reaches the preset value, a positive pulse with a certain pulse width is output as maximum ON time counting signal TP or maximum OFF time counting signal TN.

The maximum ON time counting signal TP output from timer 46 is supplied to the reset input terminal (R) of RS latch circuit 34 via OR gate 50. At that time, if switching element 14 is still in the ON state, RS latch circuit 34 is reset by the rising edge of maximum ON time counting signal TP. Switching control signal $C_{SW}$ changes from level H to level L. Switching element 14 is forcibly turned off.

Also, when maximum OFF time counting signal TN is output from timer 46, a negative pulse K with a very small pulse width is output from one-shot circuit 48 corresponding to its rising edge. At that time, if switching element 14 is still in the OFF state and the output signal $U_2$ of comparator 30 is still at level H, the output of AND gate 52 changes from level L to level H at the rising edge of the negative pulse K output from one-shot circuit 48. As a result, set signal G is supplied to RS latch circuit 34 from one-shot circuit 38. Switching control signal $C_{SW}$ changes from level L to level H. Switching element 14 is turned on forcibly.

Figure 2:
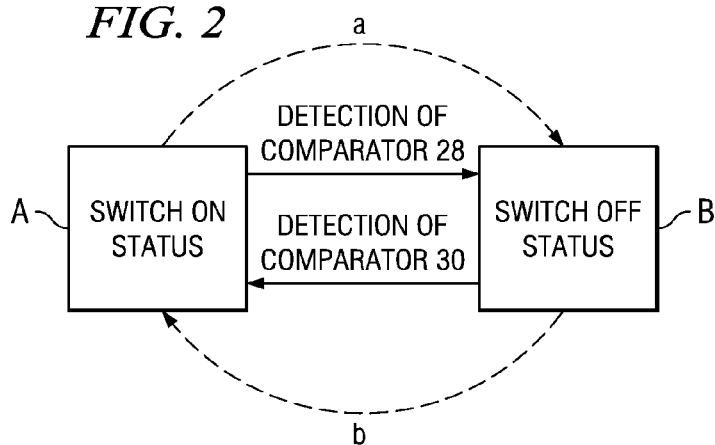
FIG. 2 is a diagram illustrating the status transition and its conditions in the photoflash charging circuit disclosed in the embodiment.

FIG. 2 shows the state transition and its conditions for a photoflash charging circuit in this embodiment. In this embodiment, mode A, in which switching element 14 is on and the power supplied from battery 12 is stored in transformer 10 in the form of electromagnetic energy, and mode B, in which switching element 14 is off and the electromagnetic energy of transformer 10 is converted into secondary current $I_{out}$ and then to the charging (electrostatic) energy of capacitor 20, are repeated alternately.

However, the transition from mode A to mode B occurs not only when comparator 28 detects that primary current $I_{sw}$ has increased to a prescribed value or larger (the first case) but also when the ON state of switching element 14 lasts longer than the maximum ON time (second case a). In the first case, the timing of the transition depends on the status of each part (especially, the power supply capacity of battery 12) and is not fixed in the primary circuit. In the second case a, the timing of the transition is absolutely fixed as long as one condition (switching element 14 stays on) lasts.

Similarly, the transition from mode B to mode A occurs not only when comparator (30) detects that the voltage between the two terminals of primary coil 24 drops to a reference level $V_{F2}$ or lower (the third case), but also when the OFF state of switching element 14 lasts longer than the maximum OFF time (fourth case b). In the third case, the timing of the transition depends on the status of each part (especially the charging voltage $V_{out}$ of capacitor 20) and is not fixed in the secondary circuit. In the fourth case b, the timing of the transition is absolutely fixed as long as one condition (switching element 14 stays off) lasts.

The photoflash charging circuit disclosed in this embodiment has a status transition function provided by said auxiliary sequences a, b. Therefore, even under said special conditions (i), (ii), (iii) described with respect to the conventional technology, the ON/OFF state of switching element 14 can be repeated in a stable and reliable manner so that an undesired stop in the charging operation can be avoided.

Figure 3:
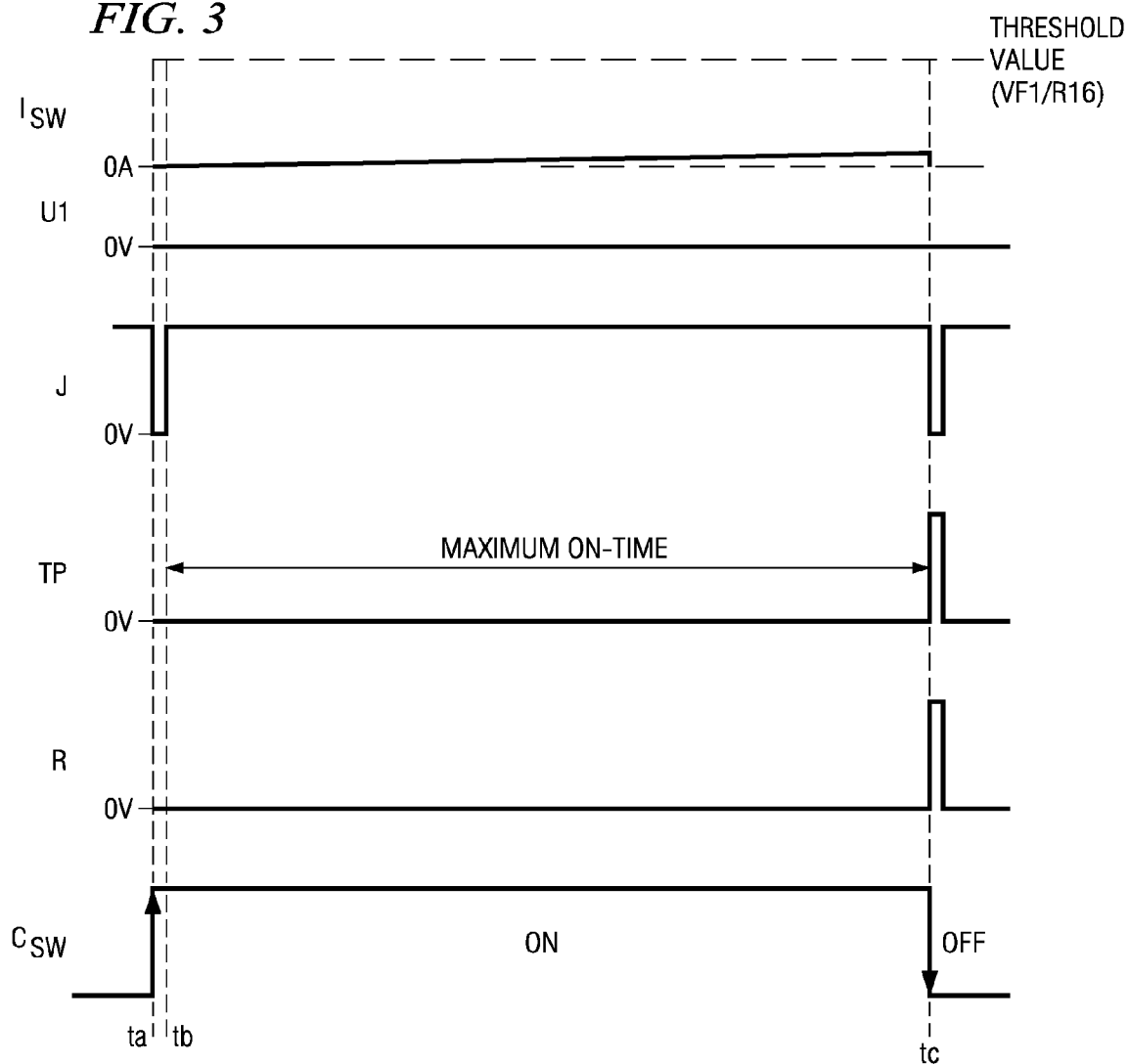
FIG. 3 is a signal waveform diagram explaining an effect of the photoflash charging circuit disclosed in the embodiment.
Figure 4:
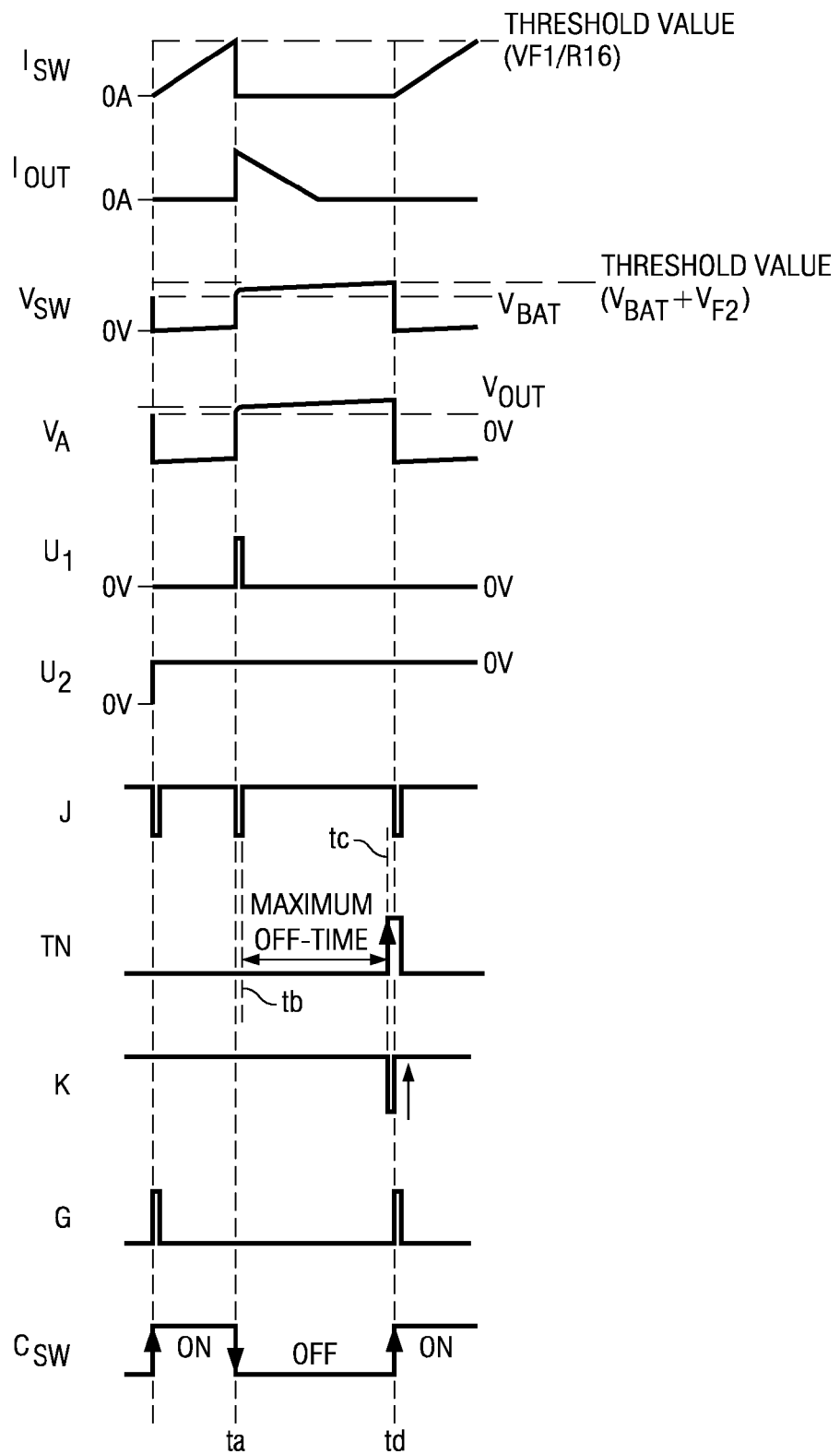
FIG. 4 is a signal waveform diagram explaining an effect of the photoflash charging circuit disclosed in the embodiment.

FIGS. 3 and 4 are waveform diagrams explaining the effect of avoiding the problem under special conditions in the photoflash charging circuit.

The example shown in FIG. 3 is special condition (i). In this case, after switching element 14 is turned on, primary current $I_{sw}$ does not increase fast enough and will take a very long time to reach the threshold value ($V_{F1}/R_{16}$). In this embodiment, as count trigger signal J, a negative pulse with a very small pulse width is generated from one-shot circuit 44 at time $t_a$ when switching control signal $C_{SW}$ rises from level L to level H to turn on switching element 14. Timer 46 starts the time counting operation at the end of said pulse J, that is, time $t_b$ of rising from level L to level H. Then, when the time counted by timer 46 reaches the maximum ON time with a preset value, maximum ON time counting signal TP of a positive pulse is output from timer 46 at that time $t_c$. This signal is input as reset signal R into RS latch circuit 34. The output signal of RS latch circuit 34, that is, switching signal $C_{SW}$, switches from level H to level L.

The example shown in FIG. 4 is special condition (ii). In this case, although switching element 14 switches from the ON state to the OFF state, the electromotive force of secondary voltage $V_A$ is small, and the induced electromotive force on the primary side or the switch terminal voltage $V_{SW}$ on the primary side in proportion to the electromotive force of the secondary voltage does not exceed the threshold value ($V_{BAT}+V_{F2}$). In this embodiment, as count trigger signal J, a negative pulse as described above is generated from one-shot circuit 44 at time $t_a$ when switching control signal $C_{SW}$ drops from level H to level L to turn off switching element 14. Timer 46 starts the time counting operation at the end time $t_b$ of said pulse J. Then, when the time counted by timer 46 reaches the maximum OFF time with a preset value, maximum OFF time counting signal TN of a positive pulse is output from timer 46 at that time $t_c$. A negative pulse K with a very small pulse width is output from one-shot circuit 48 corresponding to the rising edge of said maximum OFF time counting circuit TN. The output of AND gate 52 changes from level L to level H at the rising time $t_d$ of said negative pulse K. A positive pulse G is output from one-shot circuit 38 corresponding to the rising edge and is input to the set input terminal (S) of RS latch circuit 34. In this way, the output signal of RS latch circuit 34, that is, switching control signal $C_{SW}$, switches from level L to level H.

For special condition (iii), when switching element 14 stays on, auxiliary sequence a realized by logic parts 44-52 becomes active to perform switching control that forcibly turns off switching element 14 after the maximum ON time has elapsed. Also, when switching element 14 stays off, auxiliary sequence b realized by logic parts 44-52 becomes active to perform switching control that forcibly turns on switching element 14 after the maximum OFF time has elapsed.

When this photoflash charging circuit is not under special conditions, that is, when it is normal, each part operates in the same timing or sequence as shown in FIG. 8. The ON/OFF states of switching element 14 are repeated corresponding to the logic switch of output signals $U_1$, $U_2$ of comparators 28, 30.

Figure 5:
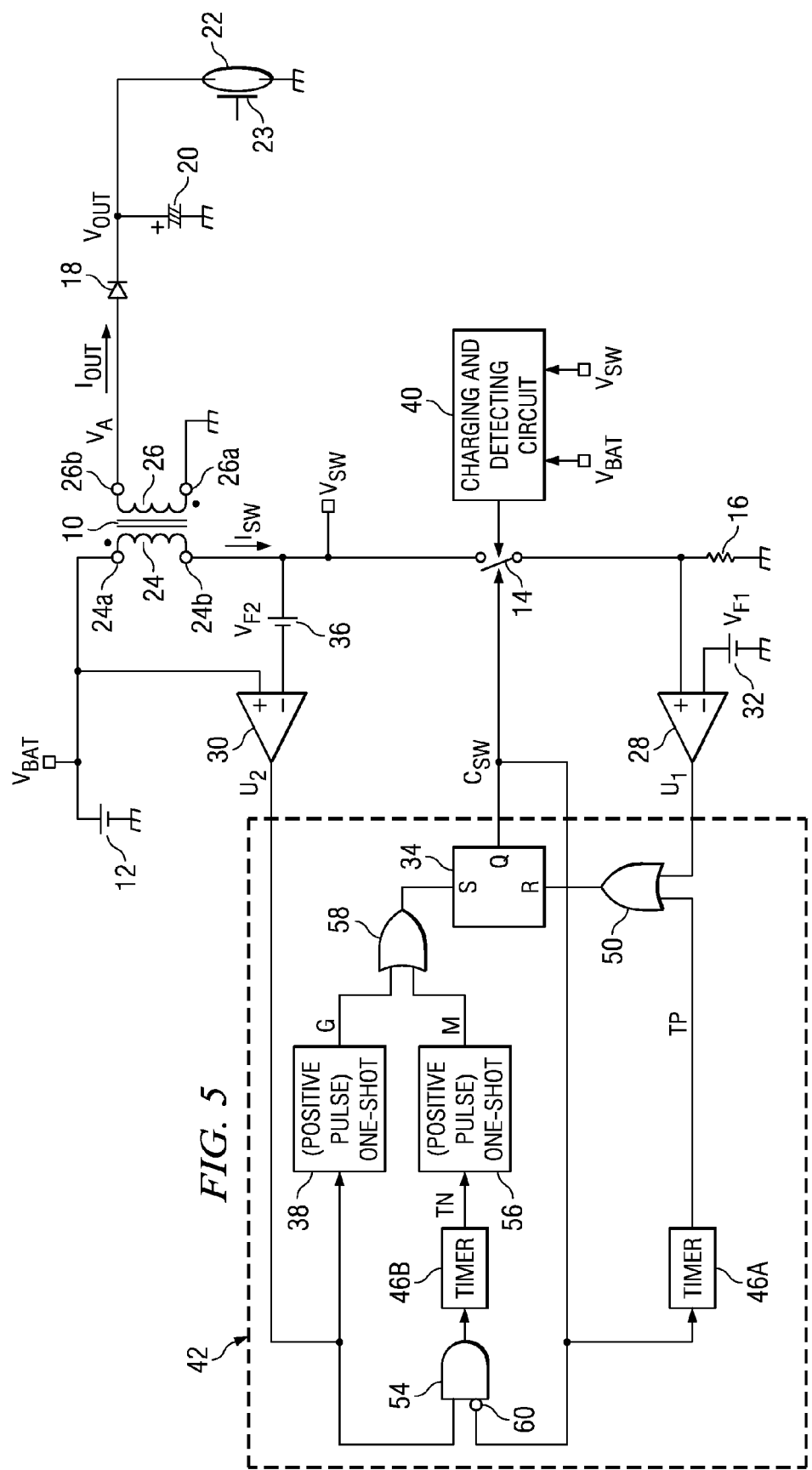
FIG. 5 is a circuit diagram illustrating the circuit configuration of a photoflash charging circuit disclosed in a modification example of the embodiment.

FIG. 5 shows the circuit configuration of a photoflash charting circuit disclosed in a modification example of this embodiment. In this case, there are two independent timers 46A, 46B in control logic 42. Said timers 46A, 46B each have their respective counter, clock circuit, and preset circuit. They can be used to set the maximum ON time and the maximum OFF time, respectively.

When switching control signal $C_{SW}$ output from RS latch circuit 34 changes from level L to level H, the first timer 46A starts a time counting operation corresponding to the rising edge and outputs maximum ON time signal TP of a positive pulse when the counted time reaches the maximum ON time. The maximum ON time signal TP is supplied to the reset input terminal (R) of RS latch circuit 34 via OR gate 50. At that time, if RS latch circuit 34 is still in the set state, RS latch circuit 34 is reset by maximum ON time signal TP. Switch control signal $C_{SW}$ changes from level H to level L, and switching element 14 switches from the ON state to the OFF state.

When switching control signal $C_{SW}$ changes from level H to level L and the output of AND gate 54 changes from level L to level H, the second timer 46B starts a time counting operation corresponding to the rising edge and outputs a maximum OFF time signal TN of a positive pulse when the counted time reaches the maximum OFF time. When the maximum OFF time signal TN is output, a positive pulse M is output from one-shot circuit 56 correspondingly. Said positive pulse M is supplied to the set input terminal (S) of RS latch circuit 34 via OR gate 58. At that time, if RS latch circuit 34 is still in the reset state, RS latch circuit 34 is set. Switching control signal $C_{SW}$ changes from level L to level H. Switching element 14 switches from the OFF state to the ON state. Symbol 60 represents an inverting circuit in control logic 42.

Figure 6:
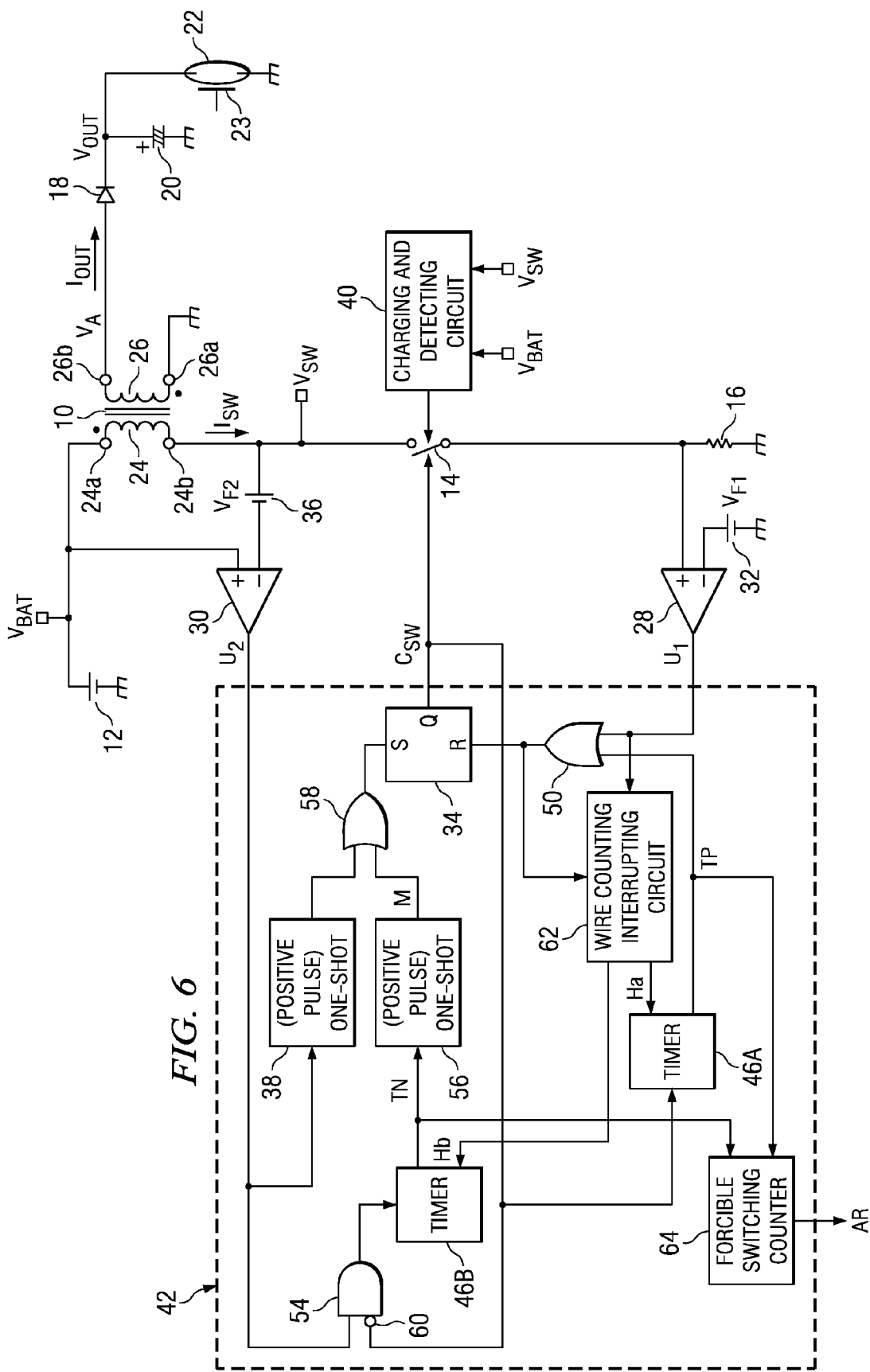
FIG. 6 is a circuit diagram illustrating the circuit configuration of a photoflash charging circuit disclosed in another modification example of the embodiment.

FIG. 6 shows the circuit configuration of a photoflash charging circuit disclosed in another modification example. One of the characteristics of this example is that there is a time counting interrupting circuit 62 in control logic 42 in the photoflash charging circuit shown in FIG. 5. The output signal of RS latch circuit 34 (switching control signal) $C_{sw}$ and the output signals $U_1$, $U_2$ of two comparators 28, 30 are input into said time counting interrupting circuit 62. Time counting interrupting circuit 62 can monitor or grasp the statuses in timers 46A and 46B through the logic switch and its timing of switching control signal $C_{SW}$. If the output signal $U_1$ of comparator 28 changes from level L to level H while timer 46A is counting the maximum ON time, a signal $H_a$ for interrupting the time counting operation is supplied to timer 46A at that time. In this case, timer 46A will restart time counting, and no maximum ON time counting signal TP is output, even if the maximum ON time with the preset value has passed. If the output signal $U_2$ of comparator 30 changes from level H to level L while timer 46B is counting the maximum OFF time, a signal $H_b$ for interrupting the time counting operation is supplied from time counting interrupting circuit 62 to timer 46B. Consequently, no maximum OFF time counting signal TN is output even if the maximum OFF time with the preset value has passed since timer 46B started time counting.

Depending on this time counting interrupting function, it is possible to prevent the occurrence of misoperation when an unnecessary maximum ON time signal or maximum OFF time signal is generated by timers 46A, 46B.

For example, when switching element 14 switches from the OFF state to the ON state, timer 46A starts time counting at the time when the status transition occurred. Subsequently, when primary current $I_{sw}$ flowing in the primary circuit increases normally and reaches the threshold value, the output signal $U_1$ of comparator 28 changes from level L to level H at that time. As a result, RS latch circuit 34 is reset, switching control signal $C_{SW}$ changes from level H to level L, and switching element 14 is switched from the ON state to the OFF state. That is, mode A is changed to mode B. In mode B, positive secondary voltage $V_A$ is generated on the secondary side as a result of electromagnetic induction as described above, and secondary current $I_{out}$ flows to charge capacitor 20. The duration of mode B is not fixed. It stops when secondary voltage $V_A$ reaches the threshold level and secondary current $I_{out}$ does not flow. At that time, the voltage between the two terminals of primary coil 24 drops to reference value $V_{F2}$ or lower on the primary side, and the output signal $U_2$ of comparator 30 changes from level L to level H. As a result, RS latch circuit 34 is set, switching control signal $C_{SW}$ changes from level L to level H, and switching element 14 is switched from the OFF state to the ON state. That is, mode B is changed to mode A. In this case, if the maximum ON time set by timer 46A is longer than the combine durations of mode A and mode B, there is a possibility that the maximum ON time counting signal will be output from timer 46A after mode A resumes. As a result, RS latch circuit 34 will be reset at an undesired timing.

However, if said time counting interrupting circuit 62 is used, when the output signal $U_2$ of comparator 30 changes from level L to level H, that is, when mode B is changed to mode A, since the time counting operation of timer 46A is interrupted, it is possible to prevent the generation of an unnecessary maximum ON time counting signal during mode A. Similarly, generation of an unnecessary maximum OFF time counting signal TN from timer 46B during mode B can be prevented by the time counting interrupting function.

In the photoflash charging circuit shown in FIG. 1, whenever the logic level of switching control signal $C_{SW}$ output from RS latch circuit 34 changes, that is, whenever switching element 14 is turned on or off, the counter of timer 46 is triggered corresponding to the count trigger signal output from one-shot circuit 44, and the time counting operation is interrupted. Consequently, maximum ON time counting signal TP or maximum OFF time counting signal TN will not be generated at an undesired timing.

The second characteristic of the photocharge charging circuit shown in FIG. 6 is that there is a forcible switching counter 64 in control logic 42. The maximum ON time counting signal TP or maximum OFF time counting signal TN output from timer 46 is input into said forcible switching counter 64, which counts the number of said signals TP, TN or the number of generation times and monitors the generation frequency. If the number of times of forcibly turning on or off switching element 14 by auxiliary sequences a, b is abnormal, in most cases, it is impossible for the charging voltage $V_{out}$ of capacitor 20 to reach the set level. By monitoring the number of times or the frequency of generation of maximum ON time counting signal TP and maximum OFF time counting signal TN, forcible switching counter 64 can generate an alarm signal AR to notify an external controller (not shown in the figure) of the failure of completion of charging. Said forcible switching counter 64 can also be used for the photoflash charging circuit shown in FIG. 1.

While the invention has particularly shown and described with reference in preferred embodiments thereof it is well understood by those skilled in the art that various changes and modifications can be made in the invention without departing from the spirit and scope of the invention as defined by the appended claims. For example, the voltage between the two terminals of primary coil 24 is monitored by comparator 30 in the embodiment. It is also possible to monitor the voltage between the two terminals of secondary coil 26. Resistor 16 used for current detection can be set anywhere in the primary circuit. The circuit configuration of control logic 42 may have various modifications. The present invention can be suitably applied to the photoflash charging circuit disclosed in the embodiment. The present invention, however, is applicable to any other kind of charging circuit, especially, any charging circuit that performs DC-DC conversion to the output voltage of a DC power supply to charge a capacitor for storing electric power.

In the embodiment, comparator 30 is designed to detect the voltage between the two terminals of primary coil 24 of transformer 10. Said comparator 30 can also be designed to detect the voltage applied to capacitor 20 used for storing electric power. The basic driving and control of the switching element in this case is the same as that described in the embodiment.

What is claimed:

1. A charging circuit that converts the output voltage of a DC power supply on a primary side of a transformer into an AC voltage by a switching operation and rectifies the AC voltage on a secondary side of the transformer to charge a capacitor for storing electric power comprising:
- a switching element arranged in a primary circuit of the transformer;
- a first switching circuit that monitors primary current flowing in the primary circuit and turns on the switching element from a OFF state when the value of the primary current has increased to a first reference value or larger;
- a second switching circuit that monitors voltage between the terminals of the primary coil or secondary coil of the transformer and turns on the switching element from the OFF state when the voltage between the terminals of the coil drops to a second reference value or lower;
- a third switching circuit that counts a first period from the time when the switching element was turned on and forcibly turns off the switching element from the ON state if the switching element has not turned off even after the first period has elapsed; and
- a fourth switching circuit that counts a second period from the time when the switching element was turned off and forcibly turns on the switching element from the OFF state if the switching element has not turned on even after the second period has elapsed.

2. The charging circuit described in claim 1, wherein, in order to monitor the value of the primary current, the first switching circuit has a resistor arranged in the primary circuit and a first comparator with one of the input terminals connected to one of the terminals of the resistor and the other input terminal connected to the other terminal of the resistor.

3. The charging circuit described in claim 2, wherein the first switching circuit has a first reference voltage source connected between one of the input terminals of the first comparator and the corresponding terminal of the resistor to generate a first reference voltage corresponding to the first reference value.

4. The charging circuit described in claim 2 wherein, the first switching circuit has a first latch circuit connected between the output terminal of the first comparator and the control terminal of the switching element to turn off the switching element in response to the output signal generated by the first comparator when the value of the primary current is increased to the first reference value or larger.

5. The charging circuit described in claim 1 wherein, in order to monitor the voltage between the two terminals of the coil, the second switching circuit has a second comparator with one of the input terminals connected to one of the terminals of the coil and the other input terminal connected to the other terminal of the coil.

6. The charging circuit described in claim 5, wherein the second switching circuit has a second reference voltage source connected between one of the input terminals of the second comparator and the corresponding terminal of the coil to generate a second reference voltage corresponding to the second reference value.

7. The charging circuit described in claim 5 wherein the second switching circuit has a second latch circuit connected between the output terminal of the second comparator and the control terminal of the switching element to turn on the switching element in response to the output signal generated by the second comparator when the voltage between the two terminals of the coil drops to the second reference value or lower.

8. The charging circuit described in claim 7, wherein the first and second latch circuits share one RS flip-flop.

9. The charging circuit described in claim 1 wherein in order to count the first period of time, the third switching circuit has a first clock circuit that generates a first clock pulse and a first counter that counts the first clock pulse up to a first preset value corresponding to the first period of time.

10. The charging circuit described in claim 9, wherein the third switching circuit has a first counting trigger circuit that starts the counting operation of the first counter corresponding to a first switching control signal used for switching the switching element from off to on.

11. The charging circuit described in claim 10, wherein the third switching circuit has a first time counting interrupting circuit that interrupts the counting operation of the first counter when the switching element is switched from the ON state to the OFF state by the first switching circuit during counting of the first period of time.

12. The charging circuit described in claim 1 wherein, in order to count the second period of time, the fourth switching circuit has a second clock circuit that generates a second clock pulse and a second counter that counts the second clock pulse up to a second preset value corresponding to the second period of time.

13. The charging circuit described in claim 12, wherein the fourth switching circuit has a second counting trigger circuit that starts the counting operation of the second counter corresponding to a second switching control signal used for switching the switching element from the ON state to the OFF state.

14. The charging circuit described in claim 13, wherein the fourth switching circuit has a second time counting interrupting circuit that interrupts the counting operation of the second counter when the switching element is switched from the ON state to the OFF state by the second switching circuit during counting of the second period of time.

15. The charging circuit described in claim 1 wherein the third and fourth switching circuits share one counter.

16. The charging circuit described in claim 1 comprising a control circuit that can forcibly turn off the switching element when the charging voltage of the capacitor reaches a set level and can keep the switching element in the OFF state until the next charging operation is started.

17. The charging circuit described in claim 1 wherein a photoflash lamp is connected to the capacitor, and the capacitor is discharged into the lamp in order to turn on the lamp.

18. A charging circuit that controls the ON/OFF operation of a switching element to supply a charging current to a coil, comprising:
- a driving circuit that supplies a driving signal used for controlling the ON/OFF operation of the switching element;
- a first detecting circuit used for detecting the current flowing through the switching element;
- a second detecting circuit used for detecting the voltage applied to the coil or the voltage applied to a charging electric storage element connected to the coil.
- a timer circuit used for counting a prescribed period of time corresponding to a logic change of the driving signal;
- a first control circuit that supplies a first control signal used for turning off the switching element in response to a first detection signal output from the first detecting circuit and a first timeout signal output from the timer circuit; and
- a second control circuit that supplies a second control signal used for turning on the switching element in response to a second detection signal output from the second detecting circuit and a second timeout signal output from the timer circuit;

the driving circuit supplies the driving signal corresponding to the first and second signals.

19. The charging circuit described in claim 18, wherein the timer circuit has a first timer to output the first timeout signal and a second timer to output the second timeout signal.

20. The charging circuit described in claim 18 comprising a timer reset circuit that resets the time counting operation of the timer circuit corresponding to at least one logic change in the first detection signal, second detection signal, and driving signal.

21. The charging circuit described in claim 18 wherein the coil is the primary coil of a transformer, and the electric storage element is a capacitor for charging which is connected to the secondary coil side of the transformer.

22. The charging circuit described in claim 21, wherein a flash circuit is driven by the electric power stored in the capacitor for charging.

* * * * *